Figure 1:
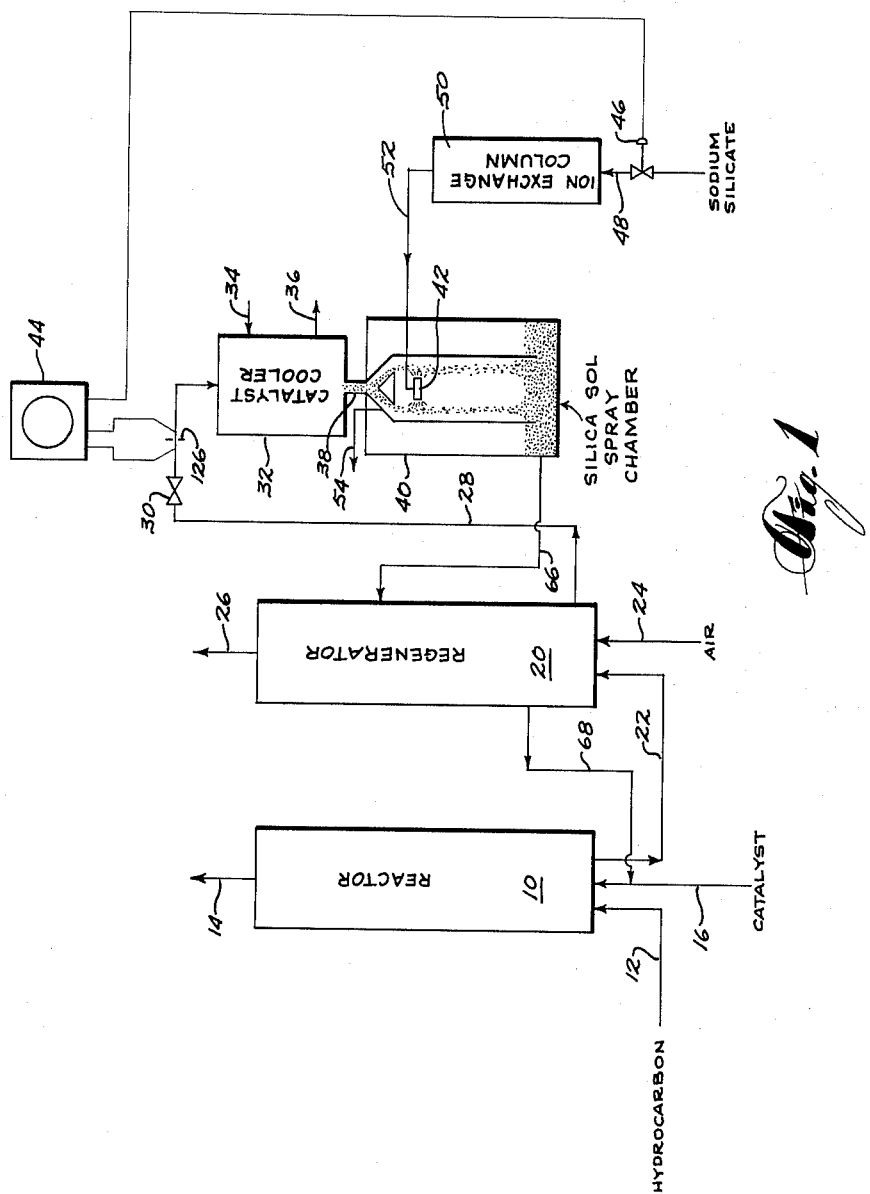

Dec. 28, 1965    W. H. HUMES ETAL    3,226,335
REACTIVATION OF CATALYSTS BY IMPREGNATION OF SILICA
Filed Sept. 26, 1962    2 Sheets-Sheet 1

INVENTORS
WILLIAM H. HUMES
MEREDITH M. STEWART
BY

ATTORNEY

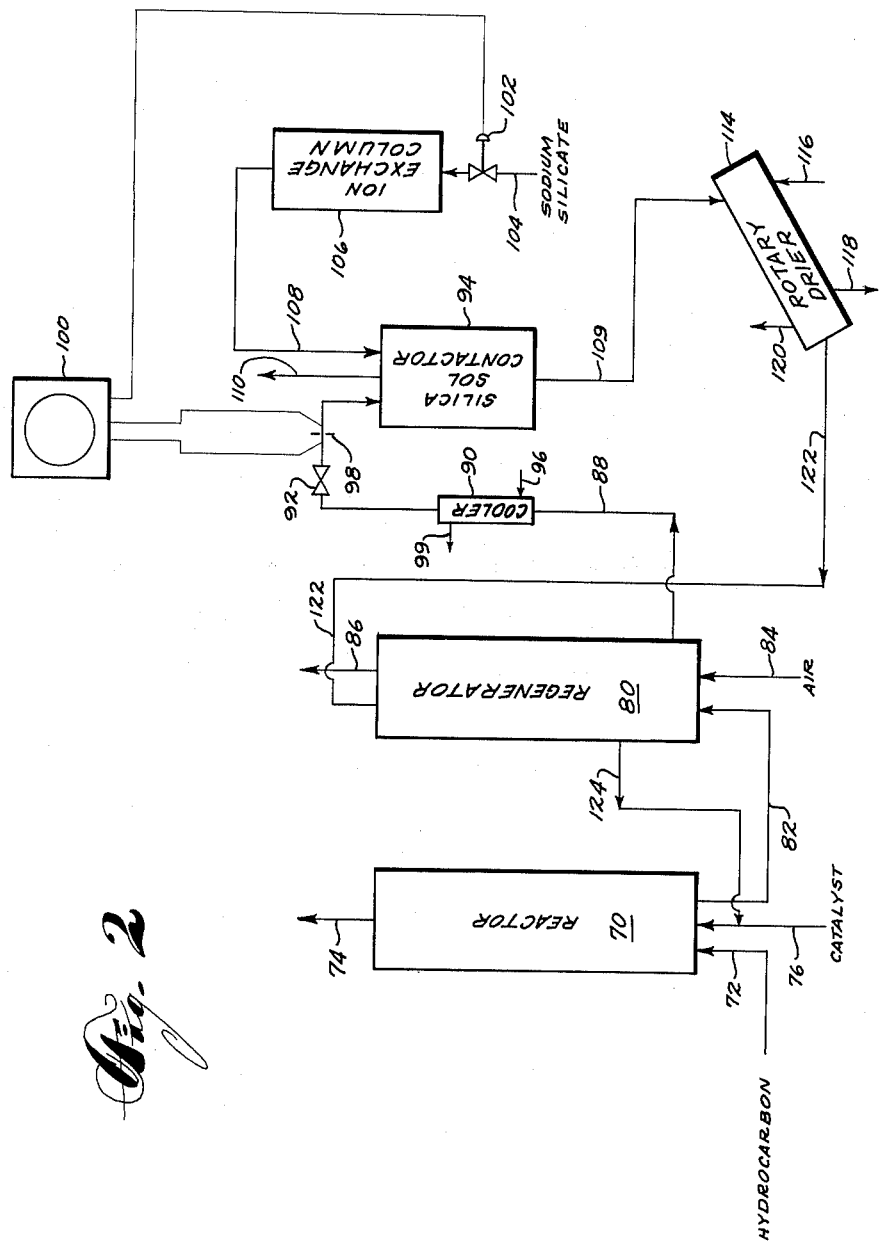

United States Patent Office 3,226,335
Patented Dec. 28, 1965

3,226,335
REACTIVATION OF CATALYSTS BY IMPREGNATION OF SILICA
William H. Humes, Allison Park, and Meredith M. Stewart, Pittsburgh, Pa., assignors to Gulf Research & Development Company, Pittsburgh, Pa., a corporation of Delaware
Filed Sept. 26, 1962, Ser. No. 226,268
6 Claims. (Cl. 252—412)

This invention relates to a process for the treatment of porous solid materials such as catalysts. More particularly, this invention relates to a process for the reactivation of deactivated catalysts by contacting said catalysts with unstabilized silica sol solution having a tendency toward transition to the gel form but prior to appreciable transition to a gel.

Silica sols are colloidal suspensions of silicic acid. Immediately after preparation, the silicic acid dispersion is essentially monomolecular. However, silica sols as prepared are unstable and readily undergo the transition of thickening and setting into a hydrogel. Aqueous silica sols are generally prepared by reaction between sodium silicate and an acid, such as sulfuric acid. When the acid is employed in the form of a protonated ion exchange resin the silica sols produced are substantially free of sodium. The absence of sodium is especially important if the sol is to be employed for catalyst treatment since sodium deactivates most hydrocarbon conversion catalysts. Once prepared, the sol must be treated in a suitable manner if it is desired to prevent transition to a hydrogel.

Since silica sol as prepared is in an unstable state tending to transform to a gel, it is common practice to subject freshly prepared sol prior to appreciable gel formation to a treatment which prevents transition thereof to a gel whereby the sol remains almost indefinitely as a suspension of silicic acid. The transition of sol to a gel can be prevented to the extent that a colloidal suspension remains stable almost indefinitely if the pH of freshly prepared sol prior to appreciable gelation is changed from its original value of about 1 to 3.5 to the pH range of about 8 to 10 by addition of a base such as ammonia. While the transition of sol to gel is relatively rapid in the pH range 1 to 3.5, in the pH range 4 to 7 the sol sets to a gel much more rapidly and sol stability is not achieved unless the pH is above 8. It has now been discovered, however, that stabilization of silica sol in this manner unexpectedly inhibits the ability of the sol to effectively reactivate a deactivated microporous catalyst such as silica-alumina.

It would be expected that stabilization of a silica sol to prevent transition thereof from a colloidal state would be an advantageous step in its preparation for use in treatment of microporous catalytic materials since a stabilized colloid would be expected to effectively penetrate fine catalyst capillaries. However, we have now discovered that the stabilized sol is not highly suitable for impregnating microporous material. Although stabilization of a sol permits the sol to remain in colloidal form and to retain the apparent characteristics of the unstabilized colloid, the process of stabilization apparently subjects the sol to some particle size growth rendering it incapable of flowing homogeneously through very fine catalyst capillaries.

In accordance with this invention silica sol is utilized in the unstabilized state for catalyst reactivation. The process of this invention comprises preparing aqueous silica sol by any suitable method such as by reaction of aqueous sodium silicate with protonated ion exchange resin, said sol being in an unstable state tending to transform to a gel, and contacting said sol while in the unstable state and prior to appreciable gel formation with a porous material such as a catalyst, followed by the drying of said porous material. During the contacting step the sol remains at the pH at which it is prepared which is within the range 1 to 3.5.

In an advantageous embodiment, the process of this invention comprises passing a porous material such as a catalyst to a silica sol contacting zone, preparing silica sol and passing said silica sol in an unstable state to said contacting zone, adjusting the rate of preparation of said silica sol in response to the rate of passage of said porous material to said zone in order that all the silica sol is utilized immediately upon its preparation, increasing the rate of preparation of silica sol upon an increase in rate of catalyst passage to said zone and decreasing the rate of preparation of silica sol upon a decrease in rate of catalyst passage to said zone, contacting said unstable silica sol with said porous material in said contacting zone, and drying said porous material.

Suitable unstabilized sols for catalyst impregnation can contain a wide concentration range of silica such as, for example, between 1 and 100 grams of silica per liter. The pH of the sols during their use as silica impregnating agents is unchanged from the pH upon preparation and is in the highly acidic range, generally between 1 and 3.5. The sols are used promptly after their preparation and prior to substantial gel formation. If the sol is very dilute, containing only about 3 percent by weight of $SiO_2$ and is at room temperature it may be used up to four hours after preparation but preferably should be used less than one hour after preparation. However, the time required for substantial gel formation after preparation of a sol depends upon a combination of variables. For example, at temperatures above room temperature gelation rate is increased, while it is relatively slow at room temperature. Also, high silicic acid concentration in the sol increases the rate of gelation while at very low concentrations of silicic acid rate of gelation is reduced. The pH of the sol is extremely critical. At pH values in the range 1 to 3.5, rate of gelation is rapid, becoming extremely rapid in the pH range 4 to 7, while at higher pH values, the sol becomes stabilized. In the pH range 4 to 7 gelation rate is so rapid that gelation often occurs instantaneously within this range.

Unstabilized silica sol can be advantageously utilized as an impregnating agent for a wide variety of microporous structures such as alumina in any form and silica-alumina. When only a moderate proportion of silica is to be deposited upon a catalyst, for example, between 0.1 to 10 percent of the catalyst weight, the treatment can be applied to a catalyst such as alumina or silica-alumina without the silica masking the catalytic activity of the material.

After a silica-alumina cracking catalyst has been on stream for an extended duration, its activity becomes reduced. The activity can be partially restored by burning carbonaceous deposits from its surface. However, the burning operation does not remove metal contaminants. The treatment with unstabilized silica sol is highly effective for the reactivation of a cracking catalyst which has been deactivated by metals, such as nickel and vanadium, contained in a hydrocarbon passing over the catalyst. On the other hand, it was found that when silica sol is stabilized against gel formation prior to catalyst treatment, its effectiveness for reactivating the catalyst is greatly diminished. The diminished effectivness of the stabilized silica sol is probably due to a growth in the size of colloidal silica particles upon stabilization to about 200 A. resulting in the inability of these particles to penetrate very small catalyst pores.

Test 1

An acid treated natural silica-alumina containing 37 percent by weight of alumina and ground to be useful as a fluid cracking catalyst was on stream for an extended period as a catalyst for cracking a gas oil containing naturally occurring metals including nickel, vanadium, iron and sodium. The process was continuous and deactivated catalyst was passed to a regenerator where substantially all carbonaceous deposits were burned from the catalyst surface at a temperature of about 1000° F. The catalyst was then divided into three portions. The first portion was subjected to a standard cracking test (Indiana Downflow) according to which 73.8 grams of the catalyst were established as a fixed bed and a light East Texas gas oil was passed downwardly over it at a space velocity of 2.0 parts by weight of hydrocarbon per hour per weight of catalyst, a temperature of 920° F., and atmospheric pressure for a period of 60 minutes. The results of this test are shown in Table I.

Test 2

The second of the three portions of the catalyst of Test 1 was impregnated with an aqueous silica sol prepared by passing aqueous sodium silicate over an acidic ion exchange resin to produce aqueous silica sol and the resulting silicic acid was then stabilized by treatment with ammonia to increase its pH from about 3.5 to about 8. The stabilized silica sol had an average colloidal particle size of about 200 A. The catalyst was soaked in the sol with stirring until about 2.5 percent $SiO_2$ based upon the catalyst weight was deposited upon the catalyst surface. The catalyst was then dried and a 73.8 gram sample was subjected to the Indiana Downflow test described in Test 1. The results are shown in Table I.

Test 3

The third portion of the catalyst of Test 1 was impregnated with an unstabilized aqueous silica sol solution prepared by passing a dilute solution of sodium silicate through the acid form of an ion exchange resin. Specifically, twelve milliliters of sodium silicate containing 2 grams of $SiO_2$ per milliliter was diluted with 53 milliliters of water and passed through a column containing 100 grams of Amberlite IR–120 ion exchange resin in the acid form. Instantaneously, upon preparation, the silica sol is monomolecular in size. The ion exchange column was at room temperature. The effluent from the column contained about 3 percent by weight of $SiO_2$, had a pH of about 3.5, was unstabilized and about 1 or 2 minutes after its preparation was used to impregnate the metal deactivated catalyst. The catalyst was soaked in the sol at room temperature with stirring so that about 2.5 percent by weight of $SiO_2$ based upon the catalyst weight was added to the catalyst. The catalyst was then dried and 73.8 grams were subjected to the Indiana Downflow test described in Test 1. The results are presented in Table I.

TABLE I

*Catalyst activity tests*

|  | Test 1 [1] | Test 2 [2] | Test 3 [3] |
| --- | --- | --- | --- |
| Conversion, Weight Percent of Charge Converted to Gasoline and Lighter (B.P. Lower than 430° F.) | 16.8 | 18.30 | 22.57 |
| Gasoline Yield, Weight Percent of Charge | 12.91 | 13.51 | 15.99 |
| Gas Yield, Weight Percent of Charge | 4.06 | 4.40 | 5.80 |
| Carbon Yield, Weight Percent of Charge | 1.26 | 1.29 | 1.53 |
| Carbon Factor, Ratio of Carbon Produced in Test to Carbon Produced by a Standard Fresh Catalyst at Same Conversion Level | 9.84 | 8.25 | 6.36 |
| Hydrogen Yield, Cubic Feet Per Barrel of Charge | 216.94 | 232 | 232.69 |
| Gas Gravity (Air=1) | 0.441 | 0.499 | 0.580 |

[1] Deactivated cracking catalyst prior to silica sol treatment.
[2] Catalyst of Test 1 treated with stabilized silica sol.
[3] Catalyst of Test 1 treated with unstabilized silica sol.

The test results in Table I show that treatment with the unstabilized silica sol in accordance with this invention produced the catalyst having highest activity for conversion to product boiling lower than 430° F., highest activity for production of gasoline and lowest carbon factor. It is also noted that the relatively high gas gravity achieved in Test 3 indicates that the gas yield in this test advantageously contains proportionately less hydrogen and methane and more higher molecular weight hydrocarbons as compared to the gaseous product from the other two tests.

FIGURES 1 and 2 illustrate advantageous process arrangements adapted to accomplish the silica sol catalyst regeneration procedure of this invention. Referring to FIGURE 1, 10 represents a reactor for performing a hydrocarbon conversion process, such as cracking, wherein the hydrocarbon charge enters through line 12 and vapor product is discharged through line 14. A fluid cracking material such as alumina, silica-alumina, silica-magnesia, silica-zirconia, etc. essentially free of other active metals, is charged to reactor 10 through line 16. Deactivated catalyst is removed from reactor 10 and is passed to regenerator 20 through line 22. Air is charged to regenerator 20 through line 24 for burning carbonaceous material from the catalyst surface and excess air and combustion products are discharged from regenerator 20 through line 26. While carbonaceous material is removed by the burning operation, metal contaminants cannot be removed from the catalyst in regenerator 20.

Catalyst is removed from regenerator 20 at a temperature of about 1000° F. to 1100° F. and a portion is passed through line 28, containing valve 30, to catalyst cooler 32. A coolant enters coils in catalyst cooler 32 through line 34 and is removed therefrom through line 36. The coolant cools the catalyst by indirect heat exchange at least to a temperature of 500° F. and preferably to a temperature in the range 300° F. to 400° F. It is important for several reasons that the catalyst be cooled prior to contact with silica sol. If the catalyst is too hot, very high temperature steam will form upon contact of the sol solution with the catalyst. It is well known that high temperature steam induces considerable deactivation in a silica alumina cracking catalyst. Furthermore, excessive expansion of water into steam upon the catalyst will fracture the catalyst subdividing it into exceedingly small particles. Also, if catalyst surfaces are at an excessively high temperature a spray of silica sol liquid will vaporize immediately upon contact with the catalyst, depositing silica only at the most exposed regions of the catalyst surface. On the other hand, at lower catalyst surface temperatures the sol remains in the liquid state long enough to permit flow into small catalyst surface pores, carrying silicic acid thereinto, and resulting in silica deposition in these hidden regions of the catalyst surface as well as in the more exposed surface regions.

Cooled catalyst falls through line 38 into spray chamber 40. The rate at which catalyst is charged to spray chamber 40 is adjusted at valve 30. This rate is ascertained by measuring pressure drop across orifice 126. This rate can be used to control the sodium silicate rate to an ion exchange column by means of recorder-controller 44 and pneumatic control valve 46 which is responsive thereto. Not only is the silica sol flow rate to the spray chamber maintained directly proportional to catalyst flow rate but, more importantly, the rate at which silica sol solution is prepared is continuously maintained directly proportional to catalyst flow rate. Since the silica sol is unstabilized when used and immediately upon preparation starts to become transformed into a gel whereby its efficiency for catalyst reactivation is impaired, it is important that only as much silica sol is prepared as is required for current use so that silica sol is never subjected to storage prior to being sprayed upon the catalyst. This control is advantageously effected by means of controller 44 which continuously pneumatically regulates valve 46 in aqueous sodium silicate line 48 leading to ion exchange column 50. In this manner only sufficient aqueous silica sol is prepared and discharged from ion exchange column 50 through line 52 to deposit between 0.5 and 10 percent by weight, and preferably about 2 to 4 percent by weight, of $SiO_2$ upon the catalyst currently flowing past spray nozzle 42.

Water vapor is removed from the spray chamber through line 54 and relatively dry $SiO_2$ impregnated catalyst falls to the bottom of spray chamber 40. If required, additional drying can be performed in chamber 40. The dry, impregnated catalyst is returned to regenerator 20 through line 66 where it becomes calcined at regenerator temperature prior to returning in a highly active condition to reactor 10 through lines 68 and 16.

Referring to FIGURE 2, 70 is a reactor for catalytically cracking a hydrocarbon stream which enters the reactor through line 72. Vaporous conversion products discharge from reactor 70 through line 74. A fluidized silica-alumina cracking catalyst enters reactor 70 through line 76. Deactivated catalyst is removed from reactor 70 and is passed to regenerator 80 through line 82. Air flows into regenerator 80 through line 84 for burning carbonaceous material from the catalyst surface. Excess air and combustion products are discharged through line 86.

Catalyst is removed from regenerator 80 at an elevated temperature of about 1000° F. to 1100° F. and is passed through line 88, containing cooler 90 and valve 92, to silica sol contacting chamber 94. Coolant enters cooling coils within cooler 90 through line 96 and is discharged therefrom through line 99. Cooler 90 indirectly cools the catalyst to a temperature within the range 300° F. to 400° F. As explained in the description of FIGURE 1, there are several important reasons for cooling the silica-alumina catalyst prior to its contact with silica sol.

The rate at which catalyst enters silica sol contactor chamber 94 is adjusted by means of valve 92 and this rate is ascertained by measurement of pressure drop across orifice 98. By means of recorder-controller 100 and pneumatic control valve 102, which is responsive to the controller, the catalyst flow rate determines not merely the rate of silica sol flow to chamber 94 but, more importantly, also determines the rate at which silica sol solution is prepared. Controller 100 pneumatically regulates valve 102 in aqueous sodium silicate line 104 leading to ion exchange column 106. In this manner only sufficient aqueous silica sol is prepared in ion exchange column 106 and discharged through line 108 to deposit a predetermined percent of $SiO_2$ upon the catalyst currently flowing into contactor 94.

Following contact of silica sol and catalyst in chamber 94, water vapor is removed through line 110 and wet catalyst impregnated with $SiO_2$ is removed through line 109 to rotary drier 114. Wet catalyst is dried in rotary drier 114 having internal heating coils to which heating fluid is charged through line 116 and from which heating fluid is removed through line 118 while water vapor is removed overhead through line 120. Dry catalyst is returned to regenerator 80 through line 122 wherein it is calcined at the elevated temperatures of the regenerator. The calcined $SiO_2$ impregnated catalyst returns to reactor 70 through lines 124 and 76.

We claim:
1. A process for the reactivation of a catalyst having a microporous structure comprising impregnating silica upon said catalyst from a substantially sodium-free aqueous silica sol solution having a pH in the range between about 1 and about 3.5, said impregnation occurring while said silica sol solution is in an unstable state tending to set to a gel but prior to appreciable gel formation.

2. Claim 1 wherein said catalyst comprises alumina.

3. Claim 1 wherein said catalyst comprises silica-alumina.

4. A process for the reactivation of a catalyst having a microporous structure comprising passing said catalyst to a silica impregnation zone, preparing an impregnation solution comprising substantially sodium-free aqueous silica sol solution having a pH in the range between about 1 and about 3.5 and which is in an unstable state tending to set to a gel, passing said unstable sol solution to said impregnation zone, adjusting the rate of preparation of said impregnation solution in direct proportion to the rate of passage of said catalyst to the impregnation zone so that said unstable silica sol impregnation solution is utilized for impregnation of silica upon said catalyst immediately upon its preparation and while said unstable silica sol impregnation solution is still colloidal.

5. A process for the reactivation of a catalyst having a microporous structure comprising passing said catalyst to a silica impregnation zone, passing aqueous sodium silicate to a protonated ion exchange column to prepare an impregnation solution comprising substantially sodium-free aqueous silica sol having a pH in the range between about 1 and about 3.5 and which is in an unstable state tending to set to a gel, passing said unstable sol solution to said impregnation zone, adjusting the rate of flow of said sodium silicate to said ion exchange column in direct proportion to the rate of passage of said catalyst to the impregnation zone so that said unstable silica sol impregnation solution is utilized for impregnation of silica upon said catalyst immediately upon its preparation while said unstable silica sol impregnation solution is still colloidal.

6. A process for the reactivation of a catalyst of the group comprising alumina and silica-alumina having a microporous structure comprising passing said catalyst to a silica impregnation zone, passing aqueous sodium silicate to a protonated ion exchange column to prepare an impregnation solution comprising substantially sodium-free aqueous silica sol having a pH in the range between 1 and 3.5 and which is in an unstable state tending to set to a gel, passing said unstable sol solution to said impregnation zone, adjusting the rate of flow of said sodium silicate to said ion exchange column so that only sufficient silica sol is recovered from said column to deposit between 0.1 and 10 percent by weight of silica upon catalyst concurrently passing into said impregnating zone, said impregnation occurring prior to appreciable gel formation in said unstable silica sol solution, and drying said catalyst.

References Cited by the Examiner
UNITED STATES PATENTS 2,579,123   12/1951   Pardee _____ 252—412

MAURICE A. BRINDISI, *Primary Examiner.*